United States Patent
Emke et al.

(10) Patent No.: US 7,143,783 B2
(45) Date of Patent: Dec. 5, 2006

(54) FUEL TANK CAP SAFETY VALVE WITH SPLASH CONTROL AND OVERPRESSURE RELEASE

(76) Inventors: Siegfried Emke, 5224 Middlecrest Rd., Rancho Palous Verdes, CA (US) 90275; Timothy F. Emke, 23510 Telo Ave., #7, Torrance, CA (US) 90505; Cristian Fischer, P.O. Box 1596, Redondo Beach, CA (US) 90278

( * ) Notice: Subject to any disclaimer, the term of this patent is extended or adjusted under 35 U.S.C. 154(b) by 292 days.

(21) Appl. No.: 10/918,235

(22) Filed: Aug. 13, 2004

(65) Prior Publication Data
US 2006/0032534 A1   Feb. 16, 2006

(51) Int. Cl.
  *F16K 17/19* (2006.01)
  *B65D 51/16* (2006.01)
(52) U.S. Cl. ............... 137/512.1; 137/43; 220/203.02; 220/203.2; 220/203.21
(58) Field of Classification Search ............... 137/43, 137/512.1, 493.8; 220/203.02, 203.2, 203.21
See application file for complete search history.

(56) References Cited

U.S. PATENT DOCUMENTS

| | | | | |
|---|---|---|---|---|
| 1,893,942 A | * | 1/1933 | Jensen | ............... 137/43 |
| 2,273,737 A | * | 2/1942 | Snyder | ............... 137/39 |
| 3,468,337 A | * | 9/1969 | Smirl | ............... 137/493.8 |
| 4,036,399 A | | 7/1977 | Gerdes | |
| 4,162,021 A | | 7/1979 | Crute | |
| 4,299,102 A | * | 11/1981 | Aro | ............... 70/165 |
| 4,337,873 A | * | 7/1982 | Johnson | ............... 220/203.02 |
| 4,378,815 A | * | 4/1983 | Mochida et al. | ............... 137/43 |
| 4,579,244 A | * | 4/1986 | Fukuta | ............... 220/203.07 |
| 4,685,584 A | | 8/1987 | Harris | |
| 4,736,863 A | | 4/1988 | Harris | |
| 4,913,303 A | | 4/1990 | Harris | |
| 4,953,583 A | | 9/1990 | Szlaga | |
| 5,031,790 A | | 7/1991 | Keller | |
| 5,971,203 A | | 10/1999 | Bae | |
| 6,648,160 B1 | | 11/2003 | Hotch | |

FOREIGN PATENT DOCUMENTS

EP           1162099       12/2001

* cited by examiner

*Primary Examiner*—Stephen M. Hepperle
(74) *Attorney, Agent, or Firm*—Gene Scott, Patent Law & Venture Group

(57) ABSTRACT

A fuel tank cap provides a safety valve mounted on a tubular vent stem for venting fluids from a fuel tank. The safety valve is adapted for engagement with the tubular vent stem so that the fluids may enter the safety valve. A pair of upper cavities communicate with the vent stem through small channels offset therefrom. The upper cavities contain valve balls seated by gravity against valve seats for restricting fluid flow from the vent stem into the upper cavities. One upper cavity provides a biasing spring seating its valve ball against the its valve seat. The upper cavities provide restrictors positioned for limiting movement of the valve balls away from their valve seats, and a cover sealingly engaged with the safety valve to form a small chamber. The upper valve body further provides exit channels for conducting the fluids to exit.

12 Claims, 4 Drawing Sheets

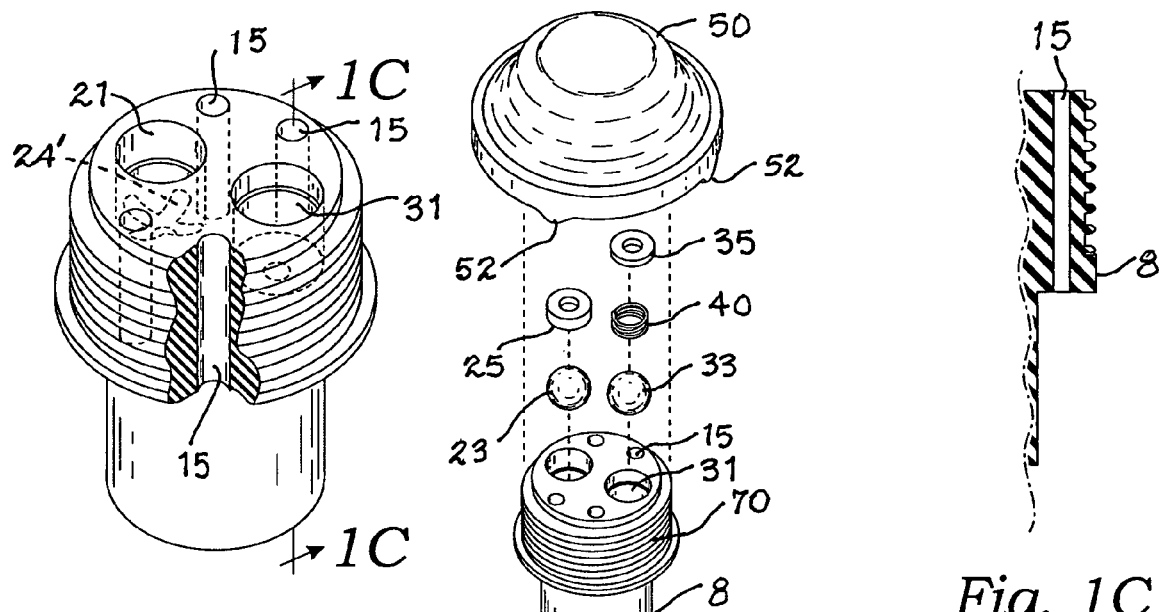
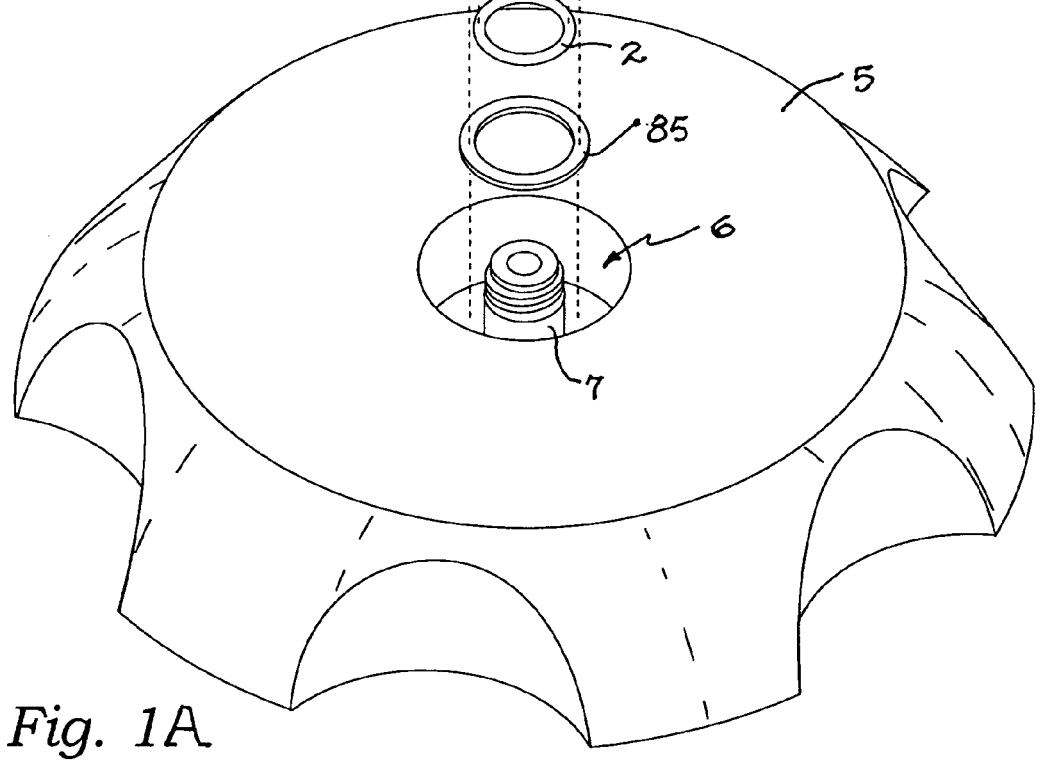

FUEL TANK CAP SAFETY VALVE WITH SPLASH CONTROL AND OVERPRESSURE RELEASE

BACKGROUND OF THE INVENTION

1. Incorporation by Reference

Applicant(s) hereby incorporate herein by reference, any and all U.S. patents, U.S. patent applications, and other documents and printed matter cited or referred to in this application.

2. Field of the Invention

This invention relates generally to safety valves for fuel tanks and more particularly to such a safety valve capable of venting fluids under normal conditions of temperature change, preventing liquid fuel splashes from exiting the fuel tank during rough riding and for preventing fuel leakage should the fuel tank become inverted.

3. Description of Related Art

For gasoline and diesel fuel powered vehicles, gas tanks are mounted and contain a supply of such fuels. The fuel in gasoline tanks is always contained as both a liquid portion and its vapor phase portion. As ambient air temperature changes, and especially when a fuel tank is heated by incident sunlight, the vapor phase pressure within the tank will rise, and as this occurs, fuel vapor must be released from the tank or the pressure within the tank will quickly reach an unsafe level. Therefore, fuel tank caps have been produced in the prior art to enable fuel vapors to escape from fuel tanks. Such vapor phase outlets, however, present a problem as liquid fuel also tends to exit the fuel tank through the vapor outlet channel, and this causes a fire hazard condition to develop. Furthermore, liquid gasoline and similar fuels are considered to be a health risk and to contaminate the environment. Especially for gasoline fuel tanks on vehicles such as motorcycles and all-terrain vehicles, there is a significant problem with liquid fuel spilling from the fuel tank through outlets designed for vapor phase release. Furthermore, when a motorcycle or similar vehicle falls over or is inverted by accident or for maintenance work, liquid fuel can escape rapidly through vapor release passages. The following abstracts define the present state of this field in contending with these problems.

Gerdes, U.S. Pat. No. 4,036,399: A gas tank cap has an inner part connectable to a gas tank filler pipe and an outer part biased outwardly away from the inner part by a spring and normally freely rotatable relative to the inner part. One or more passages in the cap communicate with the filler pipe and with the ambient atmosphere and have valves interposed in them which are so positioned that when the outer part is pushed towards the inner part the valves are automatically opened to vent pressure from the gas tank. Only after the valves have opened in response to pushing of the outer part towards the inner part do the two parts become coupled for subsequent joint rotation so as to permit removal of the gas cap from the filler pipe.

Crute, U.S. Pat. No. 4,162,021: A pressure-vacuum cap for a chamber such as an automobile gas tank having a normally upwardly extending filler neck formed with a peripherally and radially extending, upwardly facing sealing surface concentric with the longitudinal axis of the neck, the cap comprising a cover, a concentric housing extending downwardly from the cover into the filler neck and a gasket or gaskets providing a seal between the housing and the sealing surface, the housing providing a valve body having a centrally disposed, concentric passageway extending axially therethrough and in communication with the chamber. A pressure-vacuum valve assembly is disposed in that passageway for normalizing the pressure in the chamber, venting the chamber to atmosphere when the pressure in the chamber exceeds a predetermined superatmospheric level and when the pressure in the chamber drops below a predetermined subatmospheric level. The cap also provides, in addition to the pressure-vacuum valve assembly, a rollover valve assembly. Particularly, a rubber-like insert is disposed in the passageway to provide a downwardly facing, generally conical valve seat, and a ball is disposed in the passageway to move against the valve seat to close the passageway against movement of fluid from the chamber when the filler neck is tilted downwardly to a predetermined angle relative to a horizontal plane. The rubber-like insert also provides a seal against the pressure-vacuum valve assembly.

Harris, U.S. Pat. No. 4,685,584: A fuel cap for closing the filler neck of an off-road vehicle. The fuel cap includes a cover having an opening therethrough and a concentric housing extending downwardly into the filler neck and connected to the cover. A valve body having an upper and a lower chamber disposed therein is fitted into the housing and extends downwardly into the filler neck. The upper chamber and lower chamber have vent openings which cooperate with the opening in the cover to provide a vent path to allow the fuel tank to vent fuel vapor to the atmosphere. The lower chamber includes a floatation ball to seal one of the vent openings in the lower chamber to prevent fuel spillage when the vehicle is subjected to a bump, or is operated on a grade. The upper chamber includes a steel ball which seals one of the vent openings in the upper chamber to prevent fuel spillage when the vehicle is overturned to a substantially vertical position. Interposed between the upper and lower chambers is an upwardly biased plunger which, because of cooperation with the steel ball, extends into the lower chamber to prevent the floatation ball from sealing the vent opening in the lower chamber when the vehicle is in an upright position, and is operated normally. When the vehicle is subjected to a bump, or is operated on a grade, the steel ball rolls off of the upwardly biased plunger which allows the floatation ball to seal the vent opening in the lower chamber to prevent fuel spillage.

Harris, U.S. Pat. No. 4,736,863: A cap for closing the filler neck of a vehicle fuel tank is provided. The cap includes a valve body having an upper opening and movable between a normal lower position and an upper position. The valve body includes a ball disposed therein to seal the upper opening when the cap and filler neck are rolled over to a substantially inverted position and vent openings in the side wall that are located somewhat above the level of the ball when the cap and filler neck are substantially upright. When the valve body is in the normal lower position, fuel vapor is allowed to vent to the atmosphere through the vent openings and upper opening in the valve body. If the ball is upwardly and seals the upper opening prematurely, the fuel vapor will form the valve body to the upper position to allow the fuel vapor to continue to vent to the atmosphere around the valve body. In another embodiment of the invention, the cap may include an axially movable plunger to allow the ball to be manually displaced in the event the ball prematurely seals the upper opening.

Harris, U.S. Pat. No. 4,913,303: A fuel cap includes a float valve assembly for minimizing discharge of liquid fuel splash from the filler neck through the pressure-relief vent passage during normal vehicle operation. The float valve assembly is compatible with a controllable pressure-relief valve in the cap that permits venting of the tank under normal conditions and controls fuel leakage from the cap during a roll-over condition.

Szlaga, U.S. Pat. No. 4,953,583: An apparatus is provided for controlling discharge of fuel vapors from a fuel tank during refueling. The apparatus includes a conduit for conducting fuel vapor between the fuel tank and a first destination such as a vapor treatment canister situated outside of the fuel tank, a valve operable between a flow-blocking position and a flow-delivery position for selectively blocking flow of fuel vapor through the conduit, and a spring for yieldably biasing the valve toward its flow-blocking position. A venting control chamber is situated in communication with the valve for receiving and using fuel vapor pressure from the fuel tank having a magnitude in excess of a predetermined threshold level to exert an opening force on the valve in opposition to the spring so that the valve is moved to its flow-delivery position. Such movement of the valve permits discharge of pressurized fuel vapor in the tank to said first destination through the conduit In addition to the foregoing primary venting system, the apparatus is made stageable by including an optional auxiliary system for venting the fuel tank to a second destination.

Keller, U.S. Pat. No. 5,031,790: A vented fuel tank cap and valve assembly is described having a cam actuated connector for connecting the cap to the top of the filler neck tube for the tank. Three vent passages are employed in the cap with common outlet openings. One passage is normally open but includes a float valve which can close such passage when the vehicle tips.

A second passage includes a pressure relief valve which opens when the tank pressure exceeds a predetermined pressure. The bias spring for the pressure relief valve also functions as the bias for the cam actuated connector. The third passage includes fusible metal inserts provided in the movable pressure relief valve member to open such passage when the temperature of the tank exceeds the melting point of such inserts. The cam actuated connector includes ramp shaped cam surfaces on the outside of the filler neck tube and cam follower pins on the tank cap which move along the ramps and are urged into locking notches by a coil spring which also operates the pressure relief valve.

Bae, U.S. Pat. No. 5,971,203: A vent apparatus of a fuel tank comprising a housing having a through-hole at the bottom communicating with a fuel tank; a valve body mounted on the housing, having a flange, vent slots and a partition wall; a lower cover mounted under the valve body, having a through-hole communicating with the through-hole of the housing and the lower space of the valve body; a ball for opening and closing the through-hole of the partition wall of the valve body, a pushing weight mounted on the upper compartment of the valve body, having a protrusion formed on its bottom to prevent adhesion of the ball to the partition wall of the valve body; and an upper cover positioned on the top of the housing, having a plurality of outlets around its periphery. The amount of the gas vapor to be discharged per unit time in proportion to the pressure of the gas vapor in the fuel tank is controlled to maintain a stable pressure in the fuel tank, and the prevention of fuel leakage via vent apparatus, in case that the automobile is overturned, is effectively enhanced.

Hotch, U.S. Pat. No. 6,648,160: A flush-fitting fuel tank cap 110 is described herein. A flush-fitting tank cap 110 having features and advantages of the present invention is preferably characterized by a cylinder portion 30 adapted such that it may screw into a correspondingly threaded gasoline tank neck or bung 100. The tank cap 110 also preferably includes a handle portion 20 which is preferably mounted in operative relationship to the cylinder portion 30 such that rotation of the handle 20 causes corresponding rotation of the cylinder portion 30. The handle 20 is preferably movable between an up and a down position. A pin 40 is preferably disposed at or near the distal end 22 of the handle portion 20. The handle portion 20 is preferably disposed such that the pin 40 may fit into a slot 50 and a notch 54 formed in the cylinder portion. The pin 40 is preferably free to slide linearly within the slot 50, but the pin 40 preferably rotationally engages within the slot such that the handle portion 20 is restrained from rotational motion relative to the cylinder portion 30 while the handle is in the "up" position as described herein.

Hagano, EP 1 162 099: A fuel cap closes the fuel supply inlet of a filler neck at a narrow operating angle, improving the sealing properties of a gasket. The fuel cap has a cap engagement element which is brought into engagement with the opening engagement element of the filler neck, and seals the gap around the filler neck by means of the gasket. The opening engagement element is formed in an inclined state at a predetermined angle relative to the direction orthogonal to the axial direction for closing the cap. The cap engagement element has a guide surface. This surface is aligned and brought into engagement with the opening engagement element by the rotation of the fuel cap in the closing direction when this element is inserted into the filler neck. The guide surface has a first inclined portion with a considerable inclination angle and a second inclined portion whose inclination angle is smaller.

Our prior art search with abstracts described above teaches: a gas cap with automatic pressure compensation, a pressure vacuum relief fuel tank cap with roll-over safety valve feature, a vented fuel cap with bump and grade seal, a ball-valve fuel cap, a liquid splash control fuel cap, a tank pressure control valve, a quick release vent apparatus for a fuel tank, a vented fuel cap with cam actuated connector, a flush fuel cap, and a tank cap with tank cap apparatus.

However, the prior art does not teach a gas cap valve capable of being retrofitted to most common gas caps and which provides for fuel vapor venting, splash suppression and rollover sealing. The present invention fulfills these needs and provides further related advantages as described in the following summary.

SUMMARY OF THE INVENTION

The present invention teaches certain benefits in construction and use which give rise to the objectives described below.

A fuel tank cap provides a separable safety valve mounted on the cap's tubular vent stem for venting fluids from a fuel tank, preventing splashes from passing through the valve and for sealing the cap when the tank moves significantly away from its normal vertical orientation. The safety valve has a lower cavity adapted for retrofit engagement with the tubular vent stem of the cap so that fluids may enter the safety valve from the stem. Two upper cavities communicate with the stem through small flow channels which are not in line with a channel in the stem so that splashes are prevented from moving directly into the two upper cavities. The upper cavities contain valve balls; one free ball seated by gravity, the other by a spring, against valve seats for restricting fluid flow through the upper cavities. Restrictors are positioned for limiting movement of the valve balls away from their valve seats. A safety valve cover is sealingly engaged with the safety valve to form a small chamber above the safety valve. Once fuel vapor reaches the chamber it is able to move through exit channels extending through the safety valve to exit the tank cap. Vapor is able to move around the free valve ball to reach the chamber and from their to exit the cap. A sudden inrush of liquid fuel drives the free valve ball against a sealing seat in its restrictor so that the liquid cannot flow into the chamber or exit. Should the safety valve experience an extreme off-angle position so that liquid fuel fills the tubular vent of the cap, the spring will maintain a seal between the spring loaded ball and its seat, while the free valve ball will, again, be forced against its restrictor and seal against liquid flow.

A primary objective of the present invention is to provide an apparatus and method of use of such apparatus that yields advantages not taught by the prior art.

Another objective is to provide such an invention capable of conducting fluids, primarily fuel vapor, out of a fuel tank and of allowing air to enter the fuel tank depending upon temperature and atmospheric conditions.

A further objective is to provide such an invention capable of preventing liquid fuel from splashing out of the fuel tank when a vehicle experiences rough terrain or when the vehicle is set at an angle to the terrain surface.

A still further objective is to provide such an invention capable of preventing fuel leakage from a fuel tank when the vehicle is inverted.

A final objective is to provide such an invention capable of emergency venting of fluids when a selected burst pressure is reached within the fuel tank.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 1A is a perspective exploded view of the present invention;

FIG. 1B is a perspective partial cutaway view of a valve body thereof;

FIG. 1C is a partial sectional view taken along cutting line 1C—1C in FIG. 1B;

DETAILED DESCRIPTION OF THE INVENTION

The above described drawing figures illustrate the invention in at least one of its preferred embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

Figure 2:
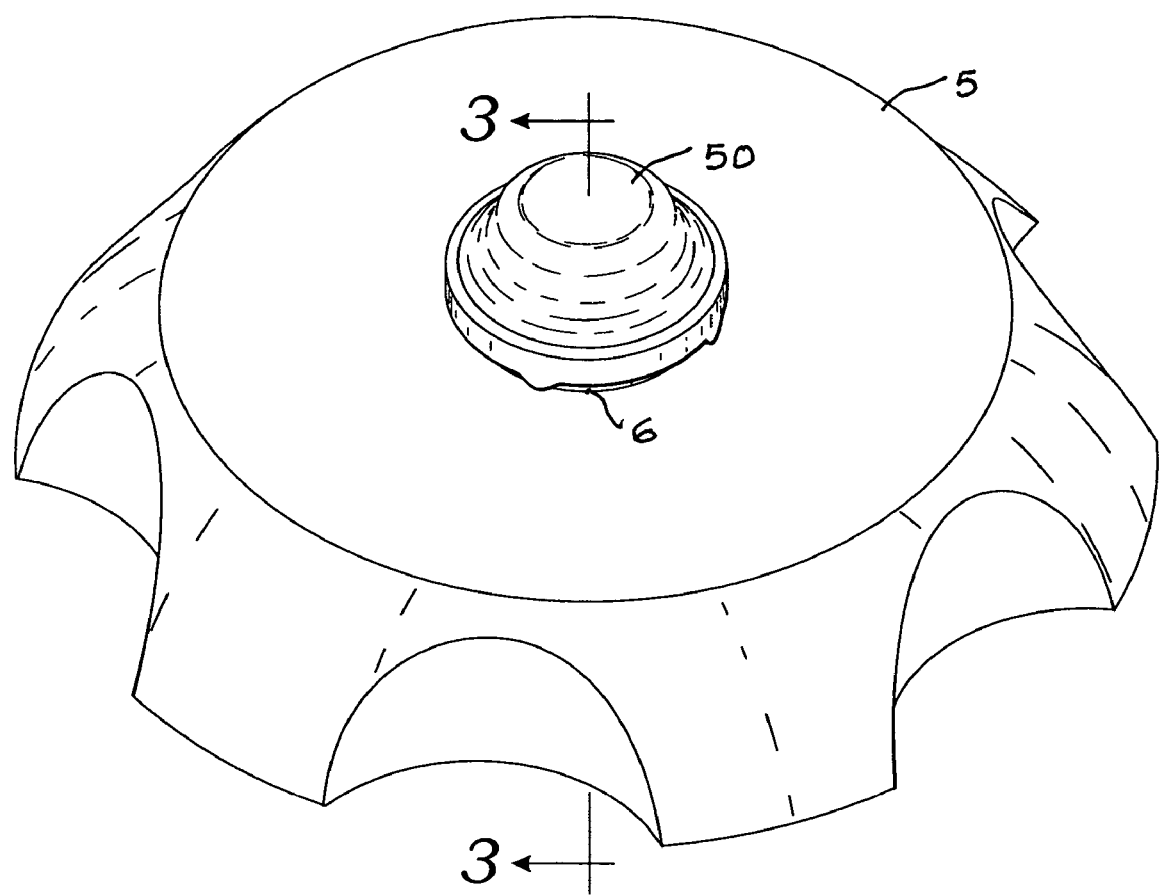
FIG. 2 is a perspective view thereof.
Figure 3:
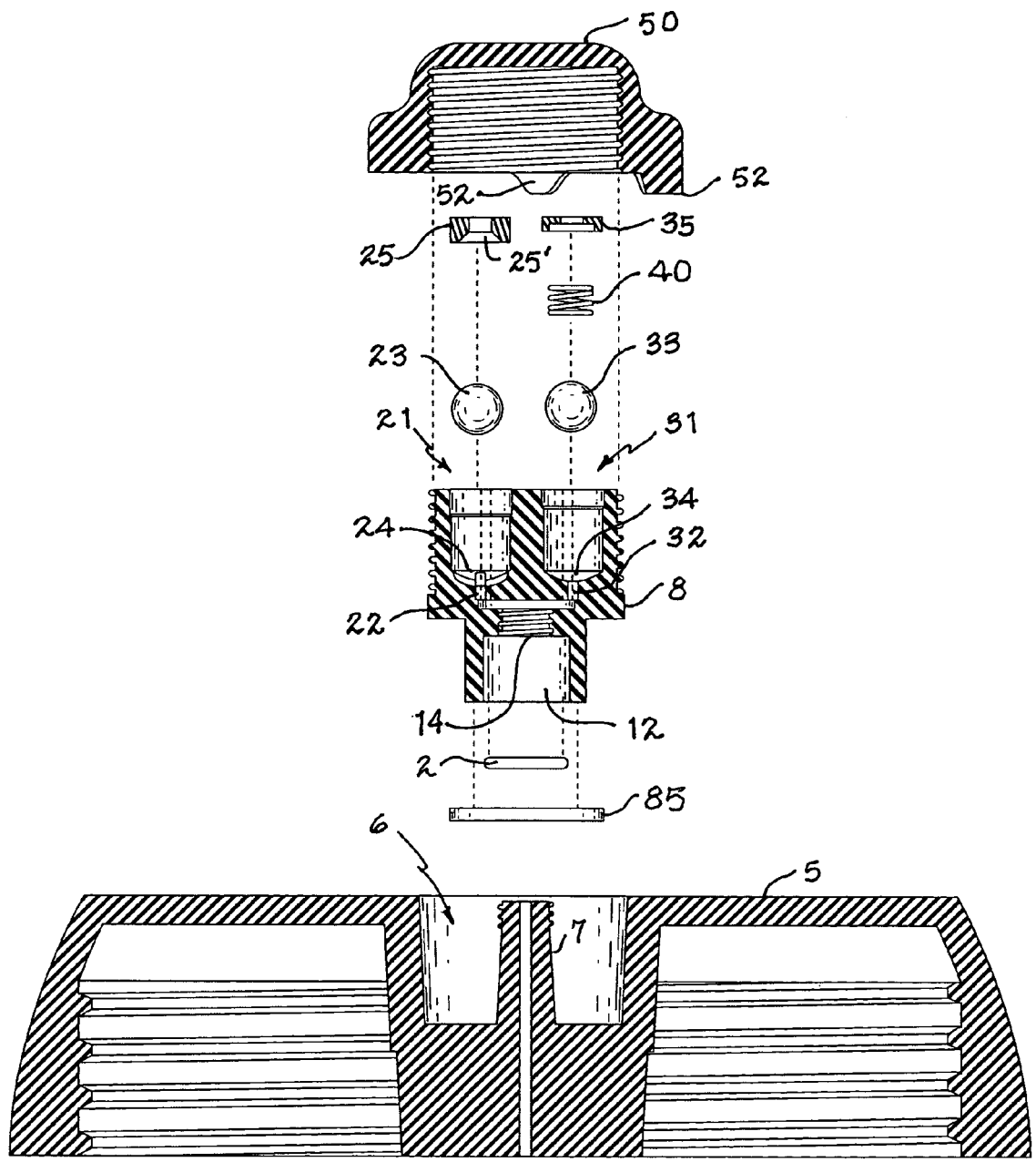
FIG. 3 is an exploded sectional view taken along cutting line 3—3 in FIG. 2.
Figure 5:
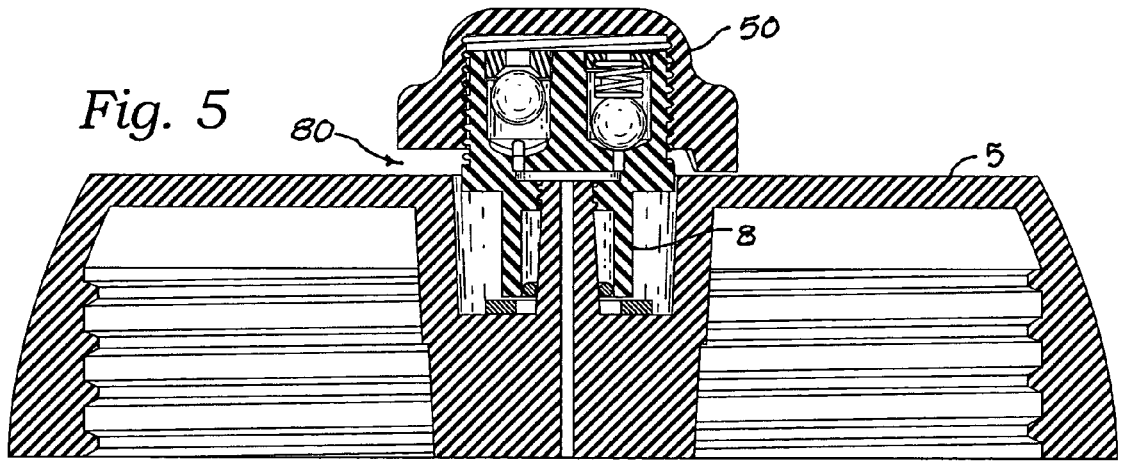
Figure 6:
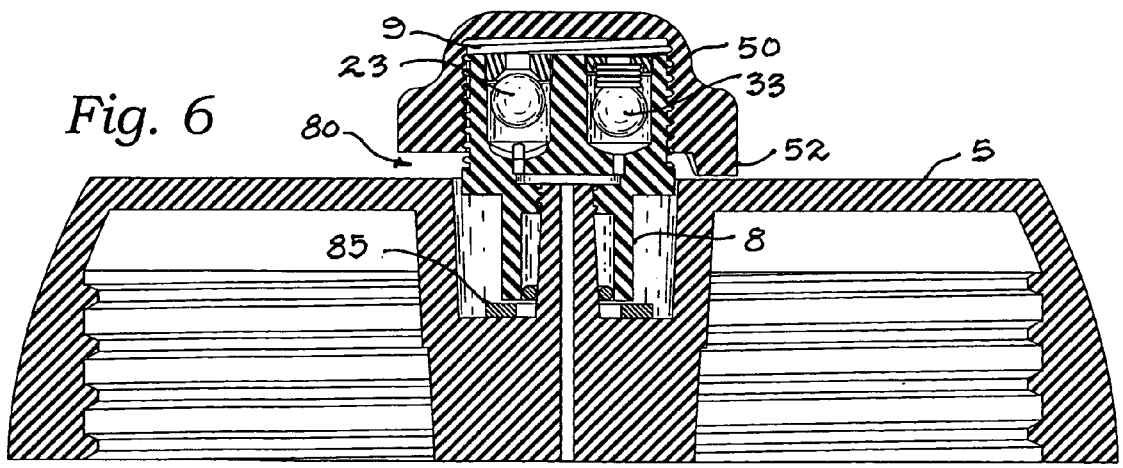

The present invention, in one embodiment, comprises a fuel tank cap 5 including a tubular vent stem 7 for venting fluids from a fuel tank (not shown). A safety valve 8 has a lower cavity 12 adapted, preferably by threads 14 for engagement with the tubular vent stem 7 so that the fluids may enter the safety valve 8. Preferably, a sealing ring 2 is used to seal safety valve 8 on vent stem 7. See FIG. 3. A first upper cavity 21 and a second upper cavity 31 communicate with the lower cavity 12 through first 22 and second 32 small channels respectively and these channels are set orthogonal to the vent stem 7 so that liquid fuel moving through the vent stem 7 must change direction in reaching the upper cavities 21, 31. This change of direction reduces the amount of momentum force that may be exerted on and carried into the upper cavities 21, 31. The upper cavities 21 and 31 contain a first 23 and second 33 valve balls respectively, where the first valve ball 23 is seated by gravity against a first valve seat 24 in the first upper cavity 21, and the second valve ball 33 is seated by a spring 40, against second valve seat 34 in the second upper cavity 31. The balls 23, 33 restrict fluid flow from the vent stem 7 through the upper cavities 21 and 31. The upper cavities 21 and 31 engage first 25 and second 35 restrictors, respectively, the restrictors 25, 35 positioned within cavities 21, 31 for limiting the magnitude of linear movement of the valve balls 23, 33 away from the valve seats 24, 34. This relationship is best shown in FIGS. 4–6.

Figure 4:
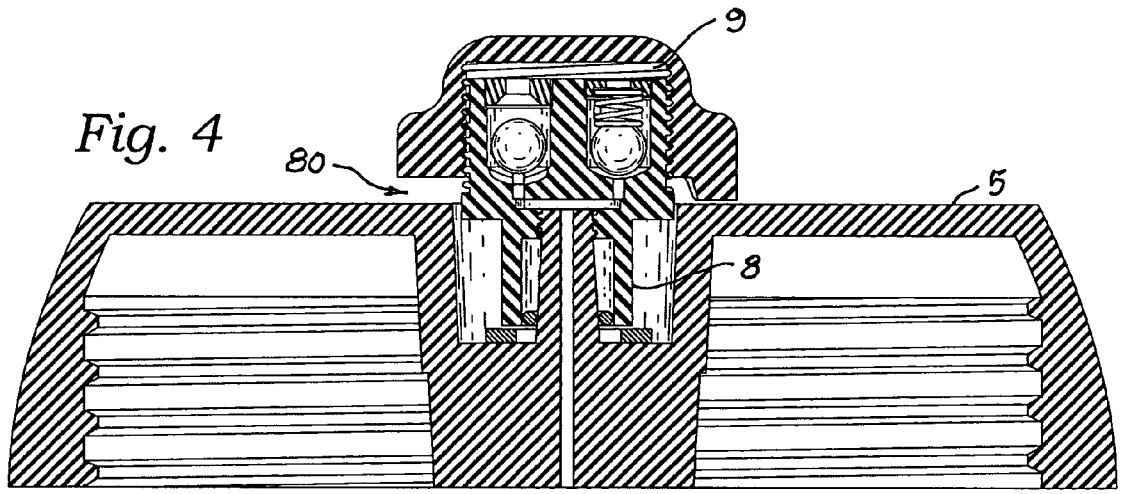
FIGS. 4, 5 and 6 are sectional views taken along cutting line 3—3 in FIG. 2 showing the several operational states of parallel valve balls of the invention.

Preferably, a cover 50 engages the safety valve 8, preferably by threaded engagement with safety valve external threads 70 and forms a chamber 9 above the safety valve 8 (FIG. 4). At least one, and preferably plural exit channels 15 extend through the safety valve 8 as best shown in FIGS. 1B and 1C. It can be seen by this, that even when a small amount of liquid fuel is able to pass through one or both of the upper cavities 21 or 31 to reach the chamber 9, it is directed downwardly from the chamber 9 through the exit channels 15 to drip into a cap well 6 where it will normally tend to evaporate and escape as vapor as long as the cap 5 is in the upright attitude.

Preferably, the first valve seat 24 provides a groove set 24' enabling fluids to flow past the first valve ball 23 at a low rate without unseating the first valve ball 23.

Preferably, the first restrictor 25 provides a restrictor valve seat 25' (FIG. 3) which is configured such that engagement with the first valve ball 23 seals the first upper cavity 21 thereby blocking fluid flow through it.

Under normal conditions, the present invention is mounted on top of a fuel tank and oriented upright relative to the gravity vector as shown in the figures. When ambient temperature changes from warm to cold, as would occur when a motorcycle is taken from a warm garage into a colder outdoor temperature, some fuel vapor within the fuel tank will tend to condense causing the tank vapor pressure to drop below atmospheric and this will cause air to move into the tank through the safety valve 8. In this case, the air cannot move through upper cavity 31 because the second valve ball 33 is sealingly seated against valve seat 34. However, air can move into the fuel tank through the first upper cavity 21 because although the first valve ball 23 is seated against first valve seat 24, seat 24 is constructed, as shown in FIG. 1B with cross-channels 24' that allow fluids to bypass first valve ball 23.

When the fuel tank is heated, as by incident sunlight, the vapor pressure in the tank will rise and the fuel vapor will tend to move out of the fuel tank through safety valve 8. Again, the fuel vapor is able to bypass fist valve ball 23 and move through the first upper cavity 21 because of the cross-channels 24' in the first valve seat 24. Gentle movement of air into the fuel tank and vapor out of the fuel tank due to pressure changes occurs with both valve balls 23 and 33 seated as shown in FIG. 4, and air and vapor flows bypassing valve ball 23.

When the fuel tank is jostled due to rough handling or rough terrain, or when the motorcycle leans into a turn or is upended, liquid fuel may be able to move through vent stem 7 and will impinge on the valve balls 23 and 33. Fuel, having greater mass then vapor, will move valve ball 23 away from its valve seat 24 and into contact with restrictor seat 25' thereby sealing first upper cavity 21 so that liquid fuel is prevented from moving through first upper cavity 21. Liquid fuel is unable to move through the second upper cavity 31 because spring 40 forces the second valve ball 33 against the second valve seat 34 sealing the cavity 31. Such movement of ball 23 against seat 25', as shown in FIG. 5 is normally momentary and the ball 23 moves back to it nominal position as shown in FIG. 4.

In extraordinary circumstances, such as when a motorcycle might be placed into an inverted attitude during a crash, and if a fire should start causing the fuel tank to heat-up rapidly, the first valve ball 23 is forced into the position shown in FIG. 6 by fuel entering the first upper cavity 21, and the second valve ball 33 will be forced against spring 40 by high vapor pressure in the fuel tank thereby relieving the pressure to forestall an explosion of high pressure gasoline vapor.

To assure that vapor (or liquid) fuel is able to exit well 6 in the fuel tank cap 5, the cover 50 provides plural bumps 52 so that should safety valve 8 and cover 50 tend to be pressed or screwed onto vent stem 7 too forcefully, a space 80 will remain for vapor to exit. Alternatively, a spacer washer 85 may be placed into well 6 so as to prevent space 80 from disappearing.

The words used in this specification to describe the invention and its various embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of this described invention and its various embodiments are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments below or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. In a fuel tank cap having a tubular vent stem for venting fluids from a fuel tank, a valve apparatus comprising: a safety valve having a lower cavity adapted for engagement with the tubular vent stem so that the fluids may enter the safety valve; a first upper cavity and a second upper cavity; the upper cavities communicating with the lower cavity through channels offset to the vent stem; the upper cavities containing a first and second valve balls respectively, the first valve ball seated by gravity against a first valve seat, and a second valve ball seated by spring force against a second valve seat; the upper cavities having first and second restrictors respectively, the restrictors positioned for limiting movement of the valve balls within the cavities; and a cover sealingly engaged with the safety valve, thereby forming a chamber from which fluid may flow through at least one exit channel extending through the safety valve so as to find exit.

2. The apparatus of claim 1 wherein the safety valve threadedly engages the tubular vent stem.

3. The apparatus of claim 1 wherein the first valve seat provides a groove set enabling fluids to flow past the first valve ball at a low rate without unseating the first valve ball.

4. The apparatus of claim 1 wherein the first restrictor provides a restrictor valve seat such that engagement between the first restrictor and the first valve ball blocks fluid flow through the first upper cavity.

5. A fuel tank cap comprising: a tubular vent stem for venting fluids from a fuel tank, a safety valve having a lower cavity adapted for engagement with the tubular vent stem so that the fluids may enter the safety valve; a first upper cavity and a second upper cavity; the upper cavities communicating with the lower cavity through channels offset to the vent stem; the upper cavities containing a first and second valve balls respectively, the first valve ball seated by gravity against a first valve seat, and a second valve ball seated by spring force against a second valve seat; the upper cavities having first and second restrictors respectively, the restrictors positioned for limiting movement of the valve balls within the cavities, and a cover sealingly engaged with the safety valve. thereby forming a chamber from which fluid may flow through at least one exit channel extending through the safety valve so as to find exit.

6. The apparatus of claim 5 wherein the safety valve threadedly engages the tubular vent stem.

7. The apparatus of claim 5 wherein the first valve seat provides a groove set enabling fluids to flow past the first valve ball at a low rate without unseating the first valve ball.

8. The apparatus of claim 1 wherein the first restrictor provides a restrictor valve seat such that engagement between the first restrictor and the first valve ball blocks fluid flow through the first upper cavity.

9. A safety valve apparatus comprising: a lower cavity adapted for engagement with a tubular vent stem of a fuel tank cap so that the fluids may enter the safety valve; a first upper cavity and a second upper cavity; the upper cavities communicating with the lower cavity through channels offset to lower cavity; the upper cavities containing a first and second valve balls respectively, the first valve ball seated by gravity against a first valve seat, and a second valve ball seated by spring force against a second valve seat; the upper cavities having first and second restrictors respectively, the restrictors positioned for limiting movement of the valve balls within the cavities; and a cover sealingly engaged with the safety valve, thereby forming a chamber from which fluid may flow through at least one exit channel extending through the safety valve so as to find exit.

10. The apparatus of claim 9 wherein the lower cavity threadedly engages the tubular vent stem.

11. The apparatus of claim 9 wherein the first valve seat provides a groove set enabling fluids to flow past the first valve ball at a low rate without unseating the first valve ball.

12. The apparatus of claim 9 wherein the first restrictor provides a restrictor valve seat such that engagement between the first restrictor and the first valve ball blocks fluid flow through the first upper cavity.

* * * * *